US009680918B2

(12) United States Patent
Kish

(10) Patent No.: US 9,680,918 B2
(45) Date of Patent: Jun. 13, 2017

(54) SOCKET APPLICATION PROGRAM INTERFACE (API) FOR EFFICIENT DATA TRANSACTIONS

(71) Applicant: Fortinet, Inc., Sunnyvale, CA (US)

(72) Inventor: William A. Kish, Millerton, NY (US)

(73) Assignee: Fortinet, Inc., Sunnyvale, CA (US)

(*) Notice: Subject to any disclaimer, the term of this patent is extended or adjusted under 35 U.S.C. 154(b) by 320 days.

(21) Appl. No.: 14/318,940

(22) Filed: Jun. 30, 2014

(65) Prior Publication Data
US 2015/0381710 A1    Dec. 31, 2015

(51) Int. Cl.
G06F 15/16    (2006.01)
H04L 29/08    (2006.01)
G06F 9/54     (2006.01)
H04L 29/06    (2006.01)

(52) U.S. Cl.
CPC ............... H04L 67/10 (2013.01); G06F 9/54 (2013.01); H04L 69/162 (2013.01)

(58) Field of Classification Search
CPC .......... G06F 9/54; H04L 67/10; H04L 69/162
See application file for complete search history.

(56) References Cited

U.S. PATENT DOCUMENTS

| 6,708,223 | B1* | 3/2004 | Wang | G06F 9/465 719/315 |
| 7,171,492 | B1* | 1/2007 | Borella | H04L 69/16 709/245 |
| 7,480,938 | B2* | 1/2009 | Minnig | H04L 29/12367 709/245 |
| 8,327,128 | B1* | 12/2012 | Prince | H04L 63/0823 713/150 |
| 2003/0097401 | A1* | 5/2003 | Bauman | H04L 69/16 709/203 |
| 2004/0093239 | A1* | 5/2004 | Ott | G06F 19/322 705/2 |
| 2005/0175016 | A1* | 8/2005 | Kim | H04L 69/16 370/395.52 |
| 2010/0232438 | A1* | 9/2010 | Bajpai | H04L 69/16 370/400 |
| 2011/0154431 | A1* | 6/2011 | Walsh | G06F 21/53 726/1 |

(Continued)

Primary Examiner — June Sison
Assistant Examiner — Dixon Dabipi
(74) Attorney, Agent, or Firm — Hamilton, DeSanctis & Cha LLP

(57) ABSTRACT

Methods and systems for efficient data transactions between applications running on devices associated with the same host. According to one embodiment, a host system includes an HTTP proxy and an SSL/TLS proxy operatively coupled with each other. The SSL/TLS proxy may be configured to perform SSL negotiation with a client and the HTTP proxy may be configured to communicate with a web server in clear text. Data can be transferred directly between the proxies through a pair of connected sockets using a handle of the other proxy's socket. The handle includes a pointer to an address within a memory of a first device upon which the other proxy is running. In this manner, data stored at the address may be processed by a proxy running on a second device without copying the data to the second device and without the overhead associated with the TCP/IP protocol stack.

19 Claims, 6 Drawing Sheets

(56) References Cited

U.S. PATENT DOCUMENTS

2011/0219131 A1\* 9/2011 Allen .................... G06F 9/54
709/228
2014/0226658 A1\* 8/2014 Kakadia ............. H04L 43/0882
370/389

\* cited by examiner

SOCKET APPLICATION PROGRAM INTERFACE (API) FOR EFFICIENT DATA TRANSACTIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present invention generally relate to networking. In particular, various embodiments relate to socket Application Program Interfaces (APIs) configured for efficient, low latency, and faster computer data transactions between two network level applications.

Description of the Related Art

The Internet is a global network of computing devices and connects devices that use a variety of different operating systems and/or programming languages, including UNIX, DOS, Windows, and Macintosh, with each other to facilitate and allow communication among these various systems and languages through protocols such as Transmission Control Protocol/Internet Protocol (TCP/IP). TCP provides a guaranteed delivery and ordering scheme for data packets such that two or more computers using TCP can rely on the protocol to ensure that any given packet will reach its destination in the order originally transmitted. IP, on the other hand, provides a point-to-point packet transmission service without guaranteed delivery.

Hyper Text Transport Protocol (HTTP) relies on the existence of a TCP connection between a client's browser and a server computer in order to fetch and display web pages. Although TCP provides guaranteed delivery capabilities using loopback mechanisms, bidirectional messaging of the TCP involves sending messages from the originator/sender network to receiver/destination network, receiving messages back at the originator from the receiver/destination network, confirmation of error-free transmission of packet data, among other like steps/communications. At the same time, loopback messages also help in diagnosing a transmission problem and checking for any errors in TCP stack. On one hand therefore, loopback operations ensures error-free data transfer, whereas on the other hand, they result in additional delays and other side effects when transmitting a stream of data. For example, if two computers use TCP to transmit a packetized video stream, the received packets may appear "jerky" because missing or dropped packets must be re-transmitted before they can be re-ordered into received packet stream.

In recent years, various attempts have been made to provide secure transmission facilities by enhancing guaranteed-delivery protocols with encryption techniques. For example, Secure Sockets Layer (SSL) (renamed Transport Layer Security (TLS)) is a protocol that provides a secure channel between two machines, such as a server computer and a client computer, wherein the secure channel is transparent yet encrypted between client and server such that nearly any protocol that can be run over TCP, can also be run over SSL/TLS with minimal modifications. SSL/TLS security and fault detection rely on TCP (or a similar guaranteed delivery protocol) to order packets and guarantee delivery. After undergoing various revisions, SSL was renamed TLS and adopted by the Internet Engineering Task Force (IETF), as reflected in RFC 2246 (The term SSL/TLS may be used herein to refer collectively to these two closely related protocols).

A conventional networking system or a even a single host can include a first system operatively coupled with a second system, wherein the first system can include one or more applications and further comprise a socket API layer that provides an interface between the applications and a TCP/IP protocol stack. The first system can further include a network interface such as, for example, a network interface card (NIC) that connects the first system with the network. Similarly, the second system can include one or more second applications, a second socket API layer that interfaces the applications with a second TCP/IP protocol stack, and a second network interface that connects the second system with the network, which, in turn, couples the second system with the first system. In operation, a packet of data associated with an application of the first system flows from the application to the socket API layer and then to the TCP/IP protocol stack through the socket API layer. A socket provided by the socket API layer is an abstraction though which an application may send and receive data. To create an instance of a socket, a protocol or address family is specified for the socket. For TCP/IP, AF_INET address family (also referred to as PF_INET) is specified, which indicates that the socket will use the protocols and addresses from the Internet Protocol (IP) family. Further, AF_INET is used typically for the loopback implementation, wherein if data is transferred from one entity to another within a single host, it is passed back up to the network stack as if it had been received from another host. Two entities within a host therefore may communicate with each other using the TCP protocol even when such communication happens internal to the host (e.g., via an internal bus, fabric or network) and not through an external network, making the local connection go through the entire TCP path, which is inefficient and uses up system resources without much merit.

Usage of the TCP protocol for loopback communications between two devices within a single host also involves data to be written to a receiving socket of a second device to be first copied into a kernel and then placed onto the output queue of first device. Furthermore, data needs to be slurped off the sending socket of the first device and packaged up by TCP and IP, run through a packet filter, check-summed, along with performing other TCP level protocol formalities/functions. The data then needs to be sent over the loopback interface and then received by IP, TCP and eventually placed on a kernel socket receive buffer. Such systems also generate and process acknowledgements.

Similar data transactions also take place in network architectures where an SSL proxy and an HTTP proxy are configured as part of an Application Delivery Controller (ADC), which is used in an application delivery network to offload certain tasks from the web servers. The SSL proxy acts as an offload mechanism by having an ability to handle SSL communications and is also responsible for negotiating SSL connections with the client, and for decrypting/encrypting, content/data transactions coming from and going to client devices respectively. The SSL proxy is programmed to listen for client queries and forward these queries to the HTTP proxy, which is logically interposed between the SSL proxy and the server, and is responsible for managing HTTP requests from client devices and forwarding these requests to the server in clear text. SSL may be used in conjunction with the HTTP proxy to create a more secure connection when browsing the Internet, with an additional advantage of offloading the server. The SSL proxy server is incorporated to take care of security concerns and works as a load balancing means for the HTTP proxy and the web server. Further, sockets as described above, are created through socket API layers that are configured in each of the SSL proxy and the HTTP proxy, wherein such sockets are typically TCP sockets that are highly inefficient as they currently use AF_INET sockets. In a general scenario, loopback messaging is performed for communication using the TCP/IP protocol between the HTTP proxy and the SSL proxy, wherein such communication currently traverse the entire TCP path. When using a TCP/IP loopback connection, although the transport layer detects that the destination of the information is local, the operating system performs complete processing of the data in the transport and network layers prior to sending the data back to itself. In effect, operating system treats data as if it is coming from a network. Therefore, multiple layers of protocol processing and logic are applied to the loopback traffic carrying data. Even though the stack is aware that the endpoints are local to the host, the stack pretends that the data originated externally, treating a local IP connection as if it is coming from the network, resulting in unnecessary processing such as inspecting, packetizing, and performing additional functions corresponding with network protocols.

There is therefore a need to provide one or more socket APIs, architectures, systems, and methods related thereto to allow fast, efficient, and reliable transaction of data between two appropriate computing devices such as an HTTP proxy and an SSL proxy, for instance.

SUMMARY

Methods and systems are described for performing efficient data transactions between applications running on devices associated with the same host. According to one embodiment, a method is provided for exchanging data between a first device and a second device residing within a single host. A first endpoint of communication is created between a first application running on the first device and a second application running on the second device by instantiating a first socket by invoking by the first application a create socket method of a first socket application programming interface (API) implemented on the first device. A second endpoint of communication is created between the first application and the second application by instantiating a second socket by invoking by the second application a create socket method of a second socket API implemented on the second device. The first socket and the second socket are connected/bound by invoking by the first application a connect method of the first socket API and by invoking by the second application a listen method of the second socket API. A handle of the second socket is obtained by the first application by invoking by the first application a get peer socket handle method of the first socket API. The handle includes at least one pointer having a value indicative of an address within a memory of the second device. Data stored at the address is then processed by the first application without copying the data to the first device.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
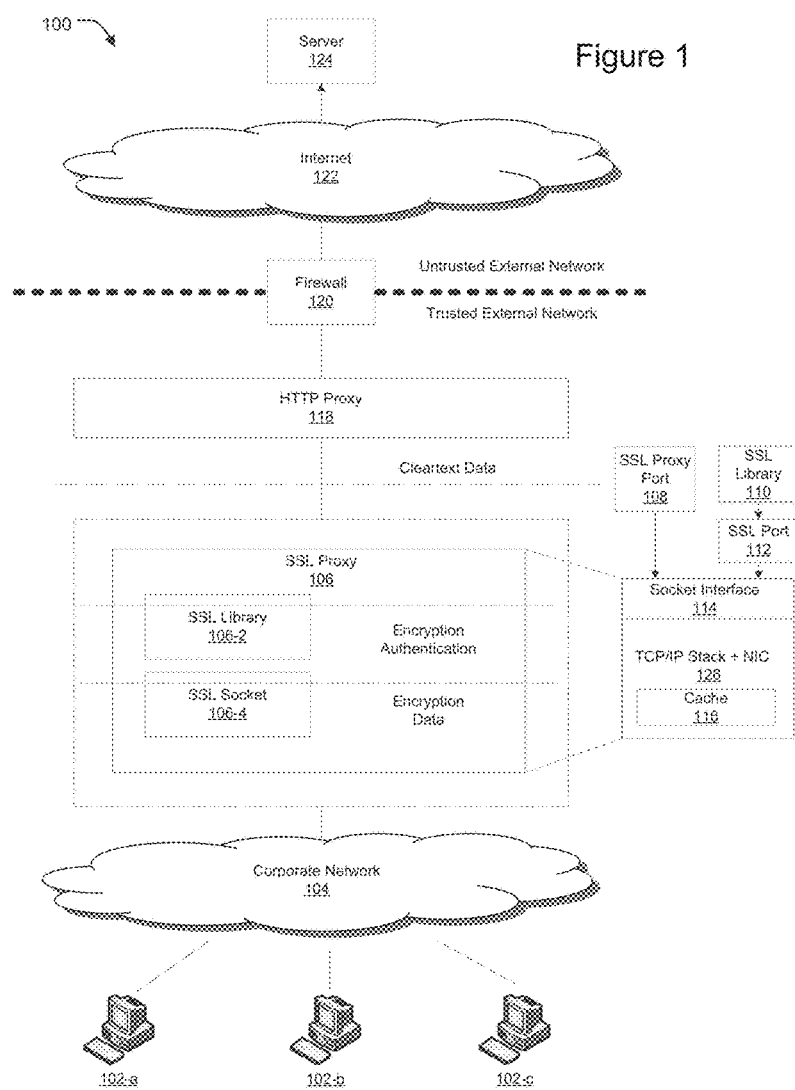
FIG. 1 illustrates an exemplary network architecture showing an HTTP proxy and an SSL proxy in accordance with an embodiment of the present invention.

Systems and methods are described for performing efficient data transactions between applications running on devices associated with the same host. According to one embodiment, one or more socket application programming interfaces (APIs) enable fast, efficient, and reliable data transfer between devices by allowing local IP connections to bypass the conventional traversal of the entire TCP path. For example, conventional steps, such as handshake, synchronization, flow control, security and acknowledgement, involved in executing TCP/IP based data transfer between local applications, such as SSL-HTTP proxies, system daemons, closely integrated databases, servers and the like, which have traditionally communicated with each other by means of loopback messages and/or by establishing loopback communications, are bypassed through use of one or more new socket APIs that enable creation of handle data structures to facilitate read/write access to respective buffers/memories of the local applications. The proposed optimized socket APIs therefore process calls from other devices without calling a TCP/IP protocol stack or lower level systems (e.g., network drivers), thereby reducing processing burdens and overhead associated with the TCP/IP protocol stack and lower level systems, and improving overall host/device performance. In one embodiment, a handle data structure can include one or more pointers for use in connection with direct access to a memory of a device referenced by the one or more pointers, thereby allowing processing of data stored within the memory of one device to be processed by another without copying the data.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present invention may be described using modular programming terminology, the code implementing various embodiments of the present invention are not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM®, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of effecting data transactions between applications of devices that are configured within a single host, it should be appreciated that the proposed architecture can also be implemented in devices that are configured on different/closely-integrated hosts/systems, and that the single host embodiment has been explained merely to illustrate the invention in an exemplary manner and any other purpose or function for which the explained structure or configuration can be used, is covered within the scope o the present disclosure.

FIG. 1 illustrates an exemplary network architecture 100 showing an HTTP proxy 118 and an SSL proxy 106 in accordance with an embodiment of the present invention. Architecture 100 can be implemented as a secured client-server architecture 100 for accessing a web server 124, wherein computing/client devices such as 102-*a*, 102-*b*, 102-*c*, . . . , and 102-*n*, are collectively referred to as client devices 102 hereinafter, include devices that are connected with Internet 122 through a corporate network 104 such as LAN, MAN, WAN, ETHERNET, and the like. In operation, a client device 102, requiring secure access for fetching a web page or for downloading a file from web server 124, communicates first with SSL proxy 106 and then with HTTP proxy 118. Access to web server 124, also interchangeably referred to as server 124 hereinafter, can be secured by means of a firewall 120, which works as a line of defense to protect the corporate network 104 from the untrusted external network.

SSL proxy 106 can precede HTTP proxy 118 for enabling secure access of server 124, and for protecting confidential client information relating to one or more client devices 102. In an implementation, one or more security checks, including encryption and decryption of data packets, which were formerly performed by server 124, can now be assigned to SSL proxy 106, wherein SSL proxy 106 and HTTP proxy 118 can communicate in clear text, which helps in load balancing HTTP proxy 118 as security-related issues are now shared by SSL proxy 106. Clear text based communication can also reduce the overhead associated with data transfer between HTTP proxy 118 and SSL proxy 106, while, at the same time, enabling additional APIs to be used/created for efficient communication between SSL proxy 106 and HTTP proxy 118. One or more sockets can be created in each of the proxies, which can facilitate the running of multiple applications, along with helping applications of the two proxies to be connected with each other by means of a socket level connection.

A socket is a software entity that provides basic building blocks for inter-process communications, and functions as an endpoint of communication between application processes. A socket uniquely identifies a connection between two communicating sides by an identifier including a network address and a network port, wherein the network address refers to address of an entity creating the socket, e.g., an application process, and the network port refers to a communications port of this entity as known to other entities in the network. Creation of a socket binds an object (i.e., a processor or a peripheral device) to an address used for communicating with the object. Sockets may generally be created by the underlying operating system (not shown) in the context of which the application is running. Once a socket is created, an application process may connect with another socket associated with another application process and thus establish a network connection with the other application process. Once the socket connection has been established between two applications or two application processes, messages and data can be sent between the applications or processes using a selected network transmission protocol. In other words, a socket is a component of an application program interface (API) that allows applications running on data processing systems in a network to communicate with each other. It identifies a communication end point in a network and can be connected to other sockets in the network. An application or process may place data in a socket that it has created and send the data to another socket connected to the first socket, thereby transmitting data to another application or process that has established the second socket. These sockets hide the protocol of the next lower layer in the underlying network architecture from the processes when performing the communication between the processes.

A client application or a server application may create a socket for communication using "socket" system calls, wherein a socket call creates an endpoint for invoking an application to communicate with the other end of a socket connection once this connection is established. Socket system call returns a socket descriptor, which is used in all subsequent socket-related system calls by the invoking application to identify the socket being used for communication.

In an embodiment, SSL proxy 106 can be used for decryption of data packets coming from client device 102, and for re-encryption of data coming from HTTP proxy 118, and can further be configured to include an SSL library 106-2 and an SSL socket 106-4, wherein SSL library 106-2 stores predefined instructions for encryption and decryption of secured SSL data coming from the client and server side and may also include instructions for data exchange with client devices 102 using one or more sockets along with enabling data exchange with HTTP proxy 118 using multiple pointers. SSL library 106-2 further stores instructions for conversion of encrypted information into clear text, which is used by HTTP proxy 118 and server 124 to help reduce overhead.

In operation, a web application communicates clear text (i.e., non-encrypted) data to an SSL library 110 and an SSL socket 106-4, wherein SSL library 110 and SSL socket 106-4 encrypt the clear text data. A TCP/IP stack 126 can then be added to the encrypted data so that an Ethernet device can communicate the TCP/IP packetized, encrypted data across the Internet 120 (or other non-secure network) to a client device 102. SSL interface 114 can work with the TCP/IP stack 126 and socket 106-4 to support SSL sessions between web application and client device 102. SSL proxy port 108 can be operatively coupled with interface 114 and configured to add SSL protection for an application, such as a web server daemon and can be interposed between the application and the network. Web server daemon communicates clear text data to SSL library 110 and socket interface 114 by way of an SSL port 112, wherein SSL library 110 and SSL socket 106-4 encrypt the clear text data. SSL proxy port 108 is a TCP port number for cleartext communication between SSL proxy 106 and the application (e.g., HTTP Port 80.). SSL port 112, on the other hand, is a TCP port number for SSL-protected communication between the SSL proxy 106 and the peer (e.g., HTTPS port 443).

In an embodiment of the present invention, HTTP proxy 118 and SSL proxy 106, which typically form part of a single host such as an application delivery controller (ADC), can be configured such that loopback communication between the proxies does not have to go through the entire TCP path. Such configuration can be enabled based on incorporation of an additional socket application programming interface (API) that enables communications to circumvent traversal of data packets through the entire TCP route and help one proxy (e.g., the SSL proxy) to get a handle of the other proxy (e.g., the HTTP proxy), wherein the handle includes a pointer that can enable the proxy to directly point to and access data from a defined memory location of the other proxy instead of actually copying data from memory of one proxy onto a receive buffer of the other. In an alternate embodiment, such a handle can also help one proxy to copy data from the other without going through the TCP/IP stack. In addition, the handle of each proxy can also be given to the other in order to enable bi-directional access/processing of data. Those skilled in the art will appreciate that even though the present disclosure has been explained with respect to proxies that are configured within a single host, any other configuration/construction is completely within the scope of the present disclosure. For instance, any two devices/applications/systems that interact through loopback messages can be configured to use the proposed socket API.

Figure 2:
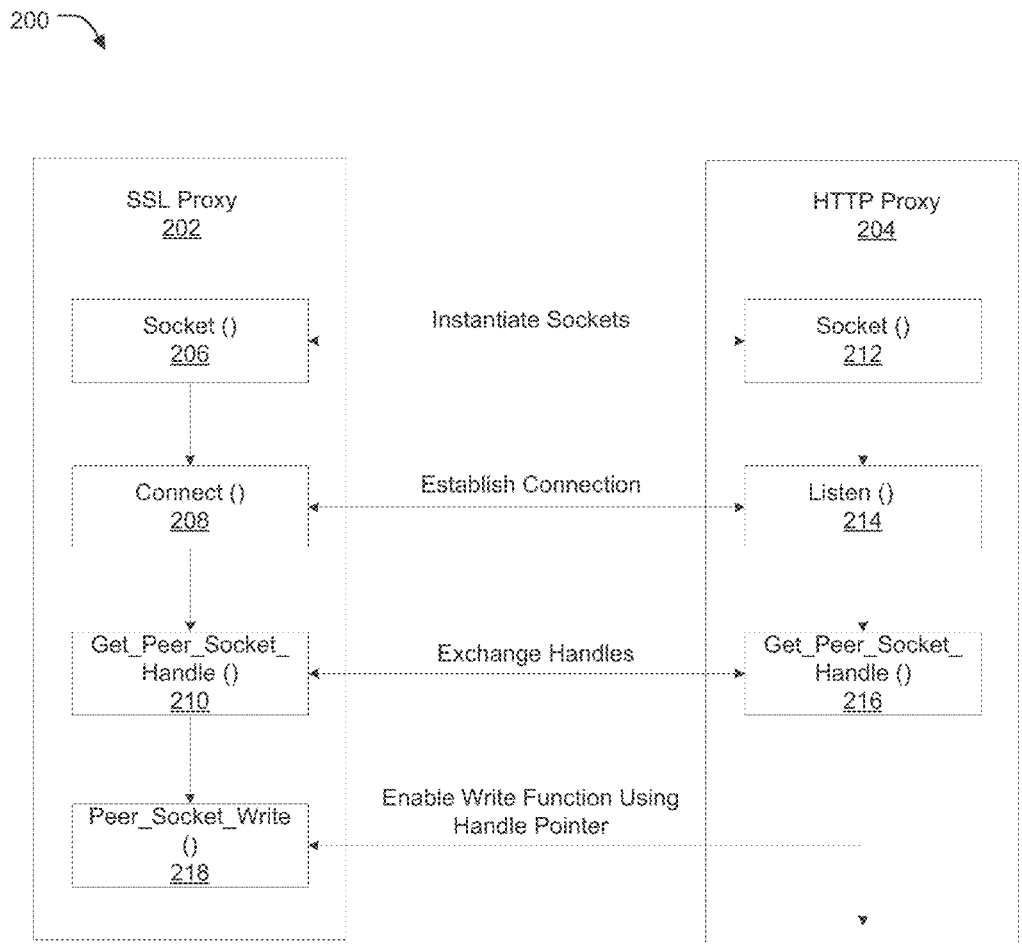
FIG. 2 illustrates socket connection and data transfer through proposed socket APIs in accordance with an embodiment of the present invention.

FIG. 2 illustrates a socket connection 200 and data transfer through the proposed socket APIs in accordance with an embodiment of the present invention. While, in the context of the present example, an SSL proxy 202 and an HTTP proxy 204 are used to illustrate use of the proposed socket API, those skilled in the art will appreciate other combinations of devices/systems that interact by means of loopback messages are also within the scope of the present disclosure. In the present example, a socket is an abstraction that facilitates communication between interfaces of SSL proxy 202 and an HTTP proxy 204. Communication between SSL proxy 202 and HTTP proxy 204 can be bi-directional and can be initiated by means of a socket that is assigned to a local port and to a buffer (associated with the port) at each of the proxies. Such a socket can be created by means of one or more methods defined by the proposed socket API, such as socket( ) 206 at SSL proxy 202, and socket( ) 212 at HTTP proxy 204. SSL proxy 202 can, in addition to communicating with loopback processes on HTTP proxy 204 via the loopback function, can also be configured to interact with remote computing devices via conventional TCP connections. Such sockets at SSL proxy 202 and/or HTTP proxy 204 can either be created after they receive a call from the other or can automatically be created, wherein the sockets provide endpoints for the calls. In an implementation, the socket can be created as follows, where sd represents a socket descriptor:

sd=socket(AF_INET, SOCK_DGRAM, 0 . . . );

The proposed socket API can also be configured to connect/bind sockets of both proxies 202 and 204 with each other through functions/methods, such as connect( ) 208 and listen( ) 214 for SSL proxy 202 and HTTP proxy, 204 respectively. In an implementation, the connect function/method can be implemented as connect(sd, . . . ). The connect function of the proposed socket API can also enable storage of characteristics of each proxy in the memory of the other proxy.

Once connected, a handle of one or both the proxies can be given to the other proxy by means of a function/method, such as get_peer_socket_handle( ) 210 and 216 for SSL 202 and HTTP proxy 204 respectively, wherein the function can be defined by the proposed socket API. Such a handle can either be created only by one of the devices or by both the devices in order to access/extract data/characteristics of the other proxy, and if desired, store such extracted characteristics in its own memory. In an implementation, a handle function/method can be called as follows:

psd=get_peer_socket_handle(sd);

According to one embodiment, a handle creation function/method call can also be coupled with the socket connection function, wherein as soon as the sockets of both the proxies are connected with each other, their respective handles can exchanged.

According to one embodiment, a pointer of a handle can enable direct reference and access to data stored at a defined memory location to which the pointer is indicating, transforming a regular socket into a high efficiency socket by enabling data transfer without actually copying from memory. For instance, SSL proxy 202 can get a handle of HTTP proxy 204 such that SSL proxy 202 may copy data stored at a particular address in a memory of the HTTP proxy 204 by having the pointer of the handle be configured to point to the respective address in the memory of the HTTP proxy 204 and data at the address can be accordingly processed by the SSL proxy 202.

According to another embodiment, a handle of a given proxy or any other appropriate device can also be used for transferring data from one proxy to the other. For instance, instead of only using a pointer to point to a memory location in HTTP proxy 204 for accessing data, SSL proxy 202 can also use the handle to fetch/transfer desired data from HTTP proxy 204 to its own memory. For instance, the proposed socket API can include a write function/method, such as peer_socket_write( ) 218 configured to copy/transfer data from SSL proxy 202 to HTTP proxy 204. A similar write function/method can always be incorporated at the HTTP proxy 204 as well. Similarly, a read function/method, such as peer_socket_read( ) can be configured to use the handle of HTTP proxy 204 to read data from HTTP proxy 204 by SSL proxy 202 and process the read data if desired. Buffers and queues can be used to move/copy data from one proxy to another, wherein data from an output queue of HTTP proxy 204 can be placed on a receive queue of the SSL proxy 202. During write operation, data can also be moved from a specific memory location of a proxy to kernel space and then put into the kernel send buffer, which data can then be processed by the proposed socket API and placed into the receive socket buffer of the destination proxy from the kernel send buffer.

Upon completion of data transactions between the proxies, the proposed socket API can further be configured to remove bindings and close sockets at one or both of the proxies when they are no longer needed.

In an implementation, the socket API of the present disclosure can include a loopback processor that acts as a software subsystem of the proposed socket API and enables the host to support the loopback function without resort to the TCP/IP stack or other lower level systems (e.g., network drivers). The loopback processor may process loopback calls from applications of other applicable proxies that reference a loopback socket. Attendant to processing loopback calls, the loopback processor may also interface with called internal processes and may temporarily store loopback data sourced by called internal processes en route to an application as well as data sourced from the application en route to called internal processes.

In another implementation, when a call to the socket API is not from a loopback socket, the socket API may forward the call to the TCP/IP stack for additional processing. In yet another implementation, whenever a new socket is created and bound, the loopback processor of the proposed socket API can be invoked to determine whether the socket is a loopback socket by checking whether the destination address is a loopback address and, if a determination is made that a socket is a loopback socket, the loopback processor can flag the socket so that subsequent calls received on the socket are easily identified for processing by the loopback processor. Such a determination may be based on the network IP address of the remote port as compared to the network IP address of the local host.

According to one embodiment, the proposed socket API can also be implemented and incorporated for multi-proxy scenarios or in systems where multiple components communicate with each other over sockets. In an instance, the proposed API can be incorporated in a host machine running UNIX, wherein UNIX includes a number of system daemons that provide various services to its user(s) by communicating with each other over sockets. In another instance, the proposed API can also be implemented for a scenario where a web server and a database are running on the same system. The database and the web server communicate with each other via TCP sockets, and as they are configured on the same system, they can connect to each other and share respective handles to enable, among other things, direct access to data in their respective memories as described above (without the overhead of going through the entire TCP path), thereby improving the efficiency of communications between the database and the web server.

In one embodiment, the proposed optimized socket APIs described herein are easily incorporated into existing programs and minimize the number of lines of code that would have to be changed. For example, the proposed peer_socket_read( ) and peer_socket_write( ) system calls can be designed to allow the existing socket read( ) and write( ) system calls to be retained. The semantics would be the same as if the sockets were not optimized. One way to make this work is to have one side of the connection (either the client or the server) make a call to a routine like setsockopt(sd, SOL_SOCKET, SO_ISLOCAL, &option, sizeof option), which would cause the kernel to perform the necessary steps to ensure that the two ends of the sockets are optimized.

Figure 3:
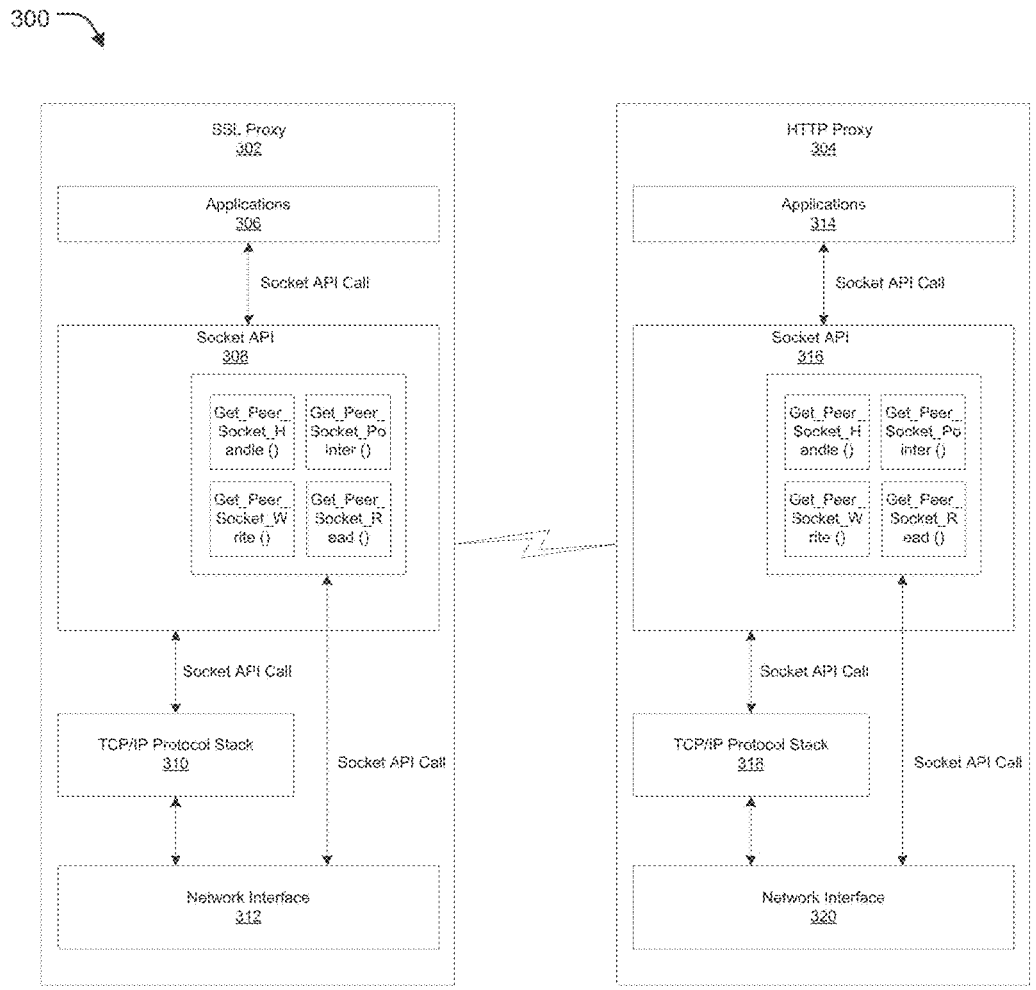
FIG. 3 illustrates exemplary socket APIs and interaction of components of an SSL proxy and an HTTPS proxy in accordance with an embodiment of the present invention.

FIG. 3 illustrates an exemplary data transaction architecture 300 showing socket APIs and interaction of components of SSL proxy 302 and HTTP proxy 304 in accordance with an embodiment of the present invention. As can be seen, each proxy 302 and 304 can include multiple applications 306 and 314, respectively, each application being configured to use one or more sockets. In the present example, a new data transaction and/or interaction socket API 308 and 316, respectively, for SSL proxy 302 and HTTP proxy 304 is implemented. Each socket API 308 and 316 can include multiple functions/methods, which may or may not be the same for both the proxies or other like devices that are configured in a single host or interact by means of loopback messages.

According to one embodiment, socket API 308 and 316 can include a get_peer_socket_handle( ) function configured to obtain a handle of a socket of a peer proxy/device. Based on the configuration and implementation of the function, a handle can also be obtained for more than one socket and/or a handle may be obtained for the complete proxy. Once obtained, such a handle, including the default characteristics of the proxy for which the handle is obtained can be stored in the memory/buffer of the proxy receiving the handle. For instance, when HTTP proxy 304 obtains a handle of SSL proxy 302, characteristics/setting/configurations of SSL proxy 302 can automatically be copied/stored/retrieved into the memory of the HTTP proxy 304. In an implementation, one or multiple handles of same or different devices can be obtained by a given proxy to enable more efficient and fast communications.

Upon creating or obtaining a handle, a pointer, which is either automatically incorporated or separately instantiated, can be used to point to a particular address location in the memory of the proxy to which the handle relates. For instance, if HTTP proxy 304 obtains a handle of SSL proxy 302, a pointer in the handle can be used to enable HTTP proxy 304 directly access a specifically defined address location in the memory/buffer of SSL proxy 302. In an implementation, in case the handle does not inherently include such a pointer, a separate socket API function, such as get_peer_socket_pointer( ), can be use to obtain such a pointer using the handle identifier. Additional read/write functions, such as peer_socket_write( ) and peer_socket_read( ), can then be used to write/read data from desired memory locations using the handle pointer. In addition, accessible data can also be copied from memory location of a source proxy to a receive buffer/memory of a destination proxy instead of merely pointing at the same.

In an implementation, TCP/IP protocol stacks 310 and 318 can also be used by respective proxies for non-loopback communication, wherein such TCP/IP stacks can be bypassed by means of one or more calls through the proposed socket API with/without the network interface 312 and 320 for SSL proxy 302 and HTTP proxy 320 respectively.

Figure 4:
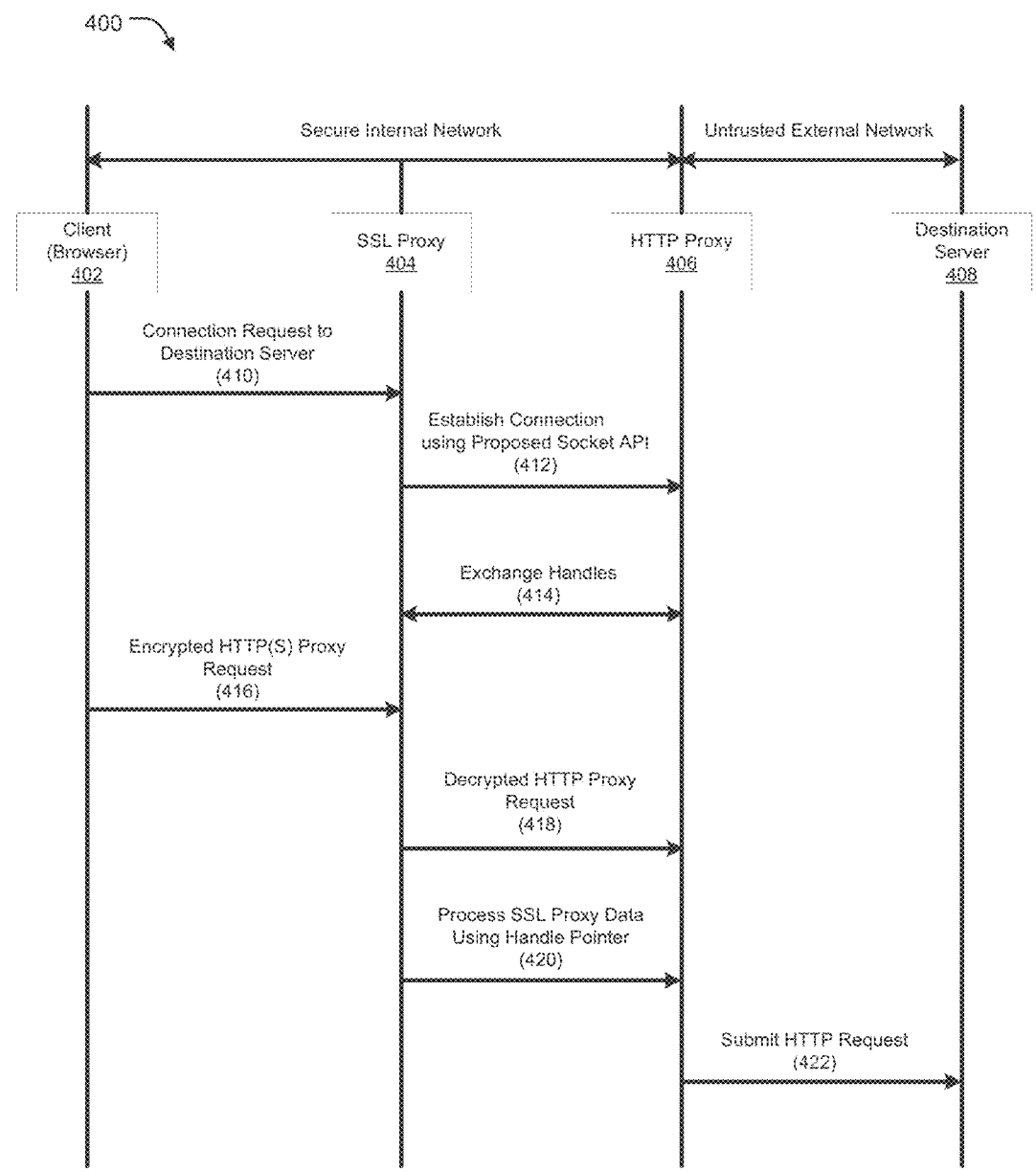
FIG. 4 illustrates an exemplary representation showing interaction between a client and a destination through an SSL proxy and an HTTP proxy in accordance with an embodiment of the present invention.

FIG. 4 illustrates an exemplary representation 400 showing interaction between a client 402 and a server 408 through an SSL proxy 404 and an HTTP proxy 406 in accordance with an embodiment of the present invention. As seen, communications from client device/browser 402 to HTTP proxy 406 are conducted over a secure internal network, whereas communications from HTTP proxy 406 to the destination server 408 are performed over an untrusted external network. Client device 402 may have an Internet browsing application or browser 402, which is operatively connected to destination server/web server 408 through SSL proxy 404 and HTTP proxy 406, wherein SSL proxy 404 is close to client device 402, and HTTP proxy 406 is logically interposed between SSL proxy 404 and destination server 408.

In an implementation, connection request 410 can be sent by client browser 402 to destination server 408, wherein request 410 can initially be received by SSL proxy 404 and then, using the proposed socket API, be used for initiating a secure connection with HTTP proxy 406. SSL proxy 404 can be incorporated to offload HTTP proxy 406 by sharing the load of initiating a secure connection. All security-related instruction exchange and protocols can be maintained by SSL proxy 404, wherein a regular Internet connection or data transfer request can also be used as a secure connection with incorporation of SSL proxy.

A connection between SSL proxy 404 and HTTP proxy 406 can be established 412 using a connect( ) function of the proposed socket API, which can enable a secure channel to be established between client device 402 and server 408. All data transfer related to activities such as web page request, database content retrieval, login, file transfer, among others, can be encrypted and transferred securely over the network using the socket connection between proxies 404 and 406. Establishment of a connection can also enable client device 402 to receive an acknowledgement such as HTTP/1.1 confirming that the connection has been established.

Once a connection has been established between proxies 404 and 406, handles of each proxy can be exchanged by means of an appropriate peer_handle function implemented through message 414, which enables one proxy to receive the handle of the other. Such a handle exchange function can also be combined with the connection function such that both the activities are conducted simultaneously.

In an implementation, through message 416, an encrypted request can be received from client device 402 by SSL proxy 404, wherein SSL proxy 404 can process and decrypt the request prior to forwarding it to HTTP proxy 406 through message 418. Data, parameters, characteristics, and configuration settings, among other like attributes, pertaining to the request can be stored at SSL proxy 404. Such content/data stored at SSL proxy 404 can be accessed and processed by HTTP proxy 406 through message 420 without copying the data physically to the memory of HTTP proxy 406, wherein the handle pointer of SSL proxy 404 issued to HTTP proxy 406 can be used to point to a memory location from which the intended data may be directly accessed. Processed HTTP request can finally be sent from HTTP proxy 406 to server 408 to get the requested information through message 422.

Figure 5:
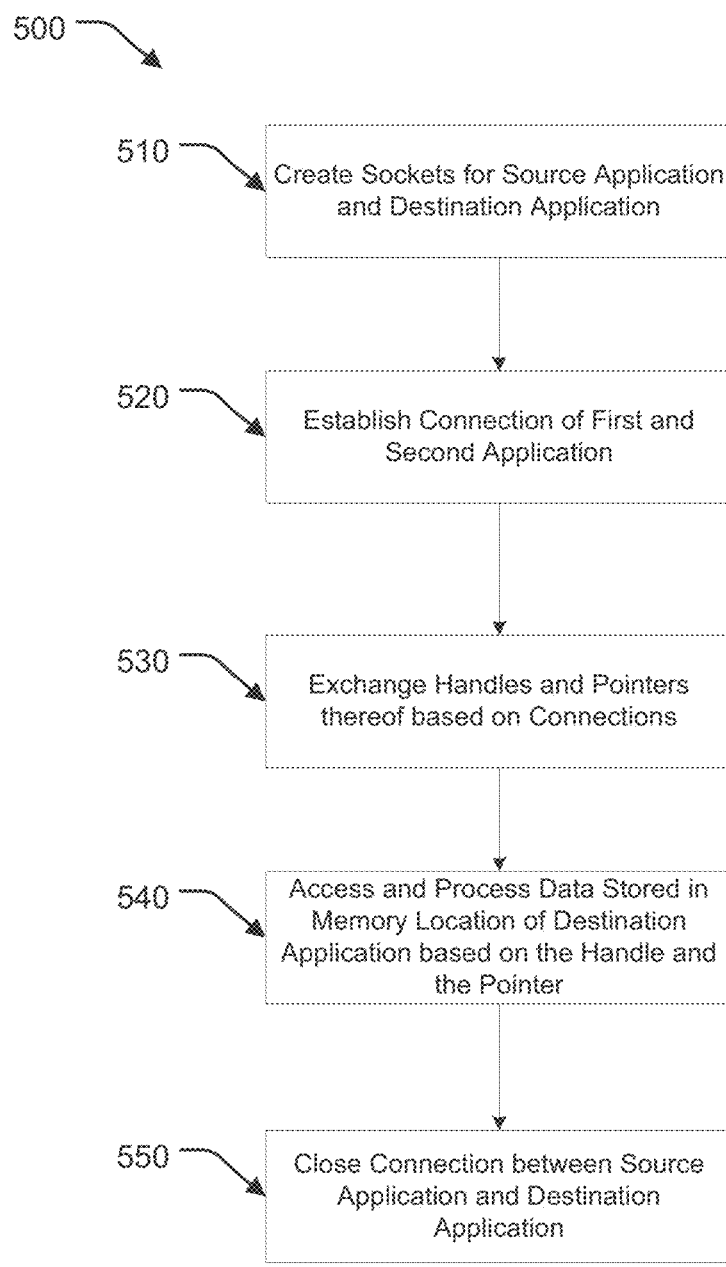
FIG. 5 is a flow diagram illustrating data transfer from an application of a first device to another application of a second device in accordance with an embodiment of the present invention.

FIG. 5 is a flow diagram 500 illustrating data transfer between a source application and a destination application in accordance with an embodiment of the present invention. Such a source application, in an embodiment, can be an HTTP proxy or an SSL proxy or any other application that is on the same host as that of the destination application and/or is configured to communicate with the destination application by means of loopback messages. Applications that reside on the same logical partition (LPAR) can also be configured to use the proposed socket API interface such that incorporation of the interface/functions defined by the socket API reduce TCP/IP protocol overhead and lower CPU utilization. The proposed socket API can also be considered to provide a non-protocol data path for loopback TCP connections. At step 510, sockets can be instantiated at each device/proxy so as to allow applications using such sockets to communicate with each other. At 520, a connection can be established between sockets of the first and second applications, wherein the first application can be running on a first device and the second application can be running on a second device.

At 530, handles and/or pointers thereof, for each device/proxy can be shared using the proposed socket API. In an instance, issuance of a handle of destination application to the source application can enable the source application to directly access buffer/queue/memory of the destination application based on the configuration settings and characteristics of the handle. Each handle can be configured to have different parameters and rights so as to control the access and type of actions that can be performed using the handle. A pointer, also referred to as a reference, of a handle can be used by the source application to retrieve and/or indicate memory location from where data is to be accessed for processing. In an implementation, multiple pointers can also be configured as being a part of a single handle. At the same time, multiple handles having different rights/settings can also be issued by the destination application to the source application.

At 540, data from a desired memory location of destination application can be accessed and processed by the source application using the pointer of the handle. Such direct reference to data in the destination application can enable the source application to process the data without explicitly copying the same. In an alternative embodiment, instead of or along with processing data stored in the destination application using the pointer, desired data or part thereof can also be copied into the memory of source application using socket API functions, such as peer_socket_read( ) or peer_socket_write( ).

At 550, upon completion of the data transactions between source and destination applications, respective sockets of each application can be closed by termination of their connection.

Figure 6:
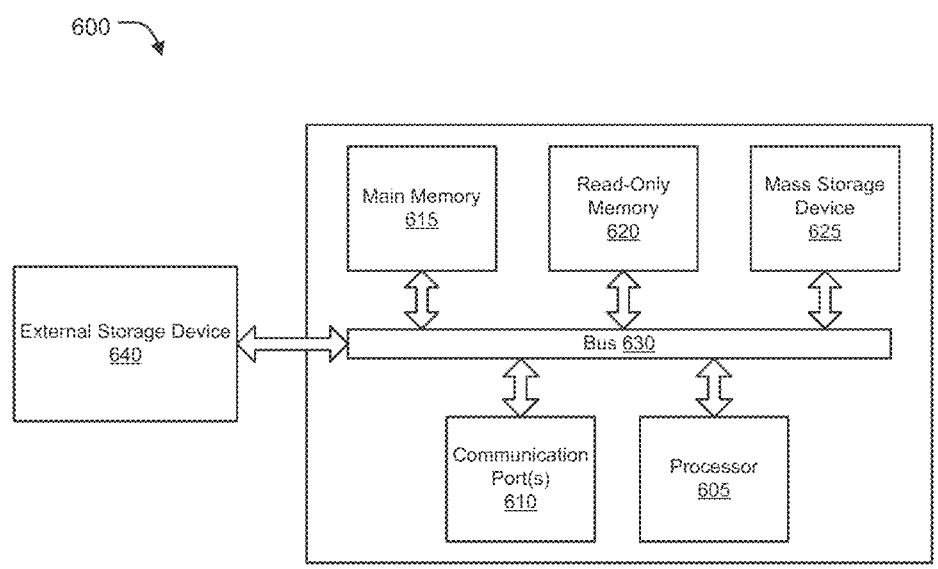
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of an ADC, SSL/TLS proxy hardware, HTTP proxy hardware, a network appliance, a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method of exchanging data between a first device and a second device residing within a single host, the method comprising:
    creating a first endpoint of communication between a first application running on the first device and a second application running on the second device by instantiating a first socket by invoking by the first application a create socket method of a first socket application programming interface (API) implemented on the first device;
    creating a second endpoint of communication between the first application and the second application by instantiating a second socket by invoking by the second application a create socket method of a second socket API implemented on the second device;
    binding the first socket and the second socket, by invoking by the first application a connect method of the first socket API and by invoking by the second application a listen method of the second socket API;
    obtaining a handle of the second socket by the first application by invoking by the first application a get peer socket handle method of the first socket API, wherein the handle includes at least one pointer having a value indicative of an address within a memory of the second device; and
    processing, by the first application, data stored at the address without copying the data to the first device.

2. The method of claim 1, further comprising causing the data to be transferred from the second device to the first device using the handle by the first application invoking a read method of the first socket API.

3. The method of claim 1, wherein the first socket and the second socket are instantiated based on one or more of AF_LOCAL, AF_INET, AF_UNIX and AF_NS address families.

4. The method of claim 1, wherein the first device comprises one or more of a system component, a firewall, a security proxy, a system daemon, a HyperText Transfer Protocol (HTTP) proxy, a Secure Sockets Layer (SSL) or Transport Layer Security (TLS) proxy, a database server and a web server.

5. The method of claim 1, wherein the second device comprises one or more of a system component, a firewall, a security proxy, a system daemon, a HyperText Transfer Protocol (HTTP) proxy, a Secure Sockets Layer (SSL) or Transport Layer Security (TLS) proxy, a database server and a web server.

6. The method of claim 1, wherein the first device comprises an HTTP proxy and the second device comprises an SSL/TLS proxy, and wherein the handle enables the HTTP proxy to place the data directly from its output queue onto a receive queue of the SSL/TLS proxy by the first application invoking a socket write method of the first socket API.

7. The method of claim 1, wherein the first device comprises an SSL/TLS proxy and the second device comprises an HTTP proxy, and wherein the handle enables the SSL/TLS proxy to read the data directly from an output queue of the HTTP proxy and onto a receive queue of the SSL/TLS proxy by the first application invoking a socket read method of the first socket API.

8. The method of claim 6, wherein the HTTP proxy performs a load-balancing function.

9. The method of claim 1, wherein each of the first device and the second device have respective buffers.

10. The method of claim 1, wherein one or both of the first socket and the second socket are configured to limit the manner in which the data can be accessed or an amount of the data that can be transferred.

11. The method of claim 1, wherein the first socket and the second socket are associated using a socket file descriptor, wherein the socket file descriptor comprises at least an Internet Protocol (IP) address and source port of the second device.

12. The method of claim 1, further comprising causing the first socket to be closed by the first application invoking a close method of the first socket API.

13. A non-transitory computer-readable storage medium embodying a set of instructions, which when executed by one or more processors of a host system, cause the one or more processors to perform a method for exchanging data between a first device and a second device residing within the host system, the method comprising:
    creating a first endpoint of communication between a first application running on the first device and a second application running on the second device by instantiating a first socket by invoking by the first application a create socket method of a first socket application programming interface (API) implemented within an operating system of the first device;
    creating a second endpoint of communication between the first application and the second application by instantiating a second socket by invoking by the second application a create socket method of a second socket API implemented within an operating system of the second device;
    binding the first socket and the second socket, by invoking by the first application a connect method of the first socket API and by invoking by the second application a listen method of the second socket API;
    obtaining a handle of the second socket by the first application by invoking by the first application a get peer socket handle method of the first socket API, wherein the handle includes at least one pointer having a value indicative of an address within a memory of the second device; and
    processing, by the first application, data stored at the address without copying the data to the first device.

14. The non-transitory computer-readable storage medium of claim 13, wherein the method further comprises causing the data to be transferred from the second device to the first device using the handle by the first application invoking a read method of the first socket API.

15. The non-transitory computer-readable storage medium of claim 13, wherein the first socket and the second socket are instantiated based on one or more of AF_LOCAL, AF_INET, AF_UNIX and AF_NS address families.

16. The non-transitory computer-readable storage medium of claim 13, wherein the first device comprises one or more of a system component, a firewall, a security proxy, a system daemon, a HyperText Transfer Protocol (HTTP) proxy, a Telnet proxy, a File Transfer Protocol (FTP) proxy, a Secure Sockets Layer (SSL) or Transport Layer Security (TLS) proxy, a database server and a web server.

17. The non-transitory computer-readable storage medium of claim 13, wherein the second device comprises one or more of a system component, a firewall, a security proxy, a system daemon, a HyperText Transfer Protocol (HTTP) proxy, a File Transfer Protocol (FTP) proxy, a Secure Sockets Layer (SSL) or Transport Layer Security (TLS) proxy, a database server and a web server.

18. The non-transitory computer-readable storage medium of claim 13, wherein the first device comprises an HTTP proxy and the second device comprises an SSL/TLS proxy, and wherein the handle enables the HTTP proxy to place the data directly from its output queue onto a receive queue of the SSL/TLS proxy without requiring processing of the data by a transport layer or a network layer of network stacks implemented by the SSL/TLS proxy and the HTTP proxy by the first application invoking a socket write method of the first socket API.

19. The non-transitory computer-readable storage medium of claim 13, wherein the first device comprises an SSL/TLS proxy and the second device comprises an HTTP proxy, and wherein the handle enables the SSL/TLS proxy to read the data directly from an output queue of the HTTP proxy and onto a receive queue of the SSL/TLS proxy without requiring processing of the data by a transport layer or a network layer of network stacks implemented by the SSL/TLS proxy and the HTTP proxy by the first application invoking a socket read method of the first socket API.

\* \* \* \* \*